(12) United States Patent
Froehlich et al.

(10) Patent No.: US 10,774,929 B2
(45) Date of Patent: Sep. 15, 2020

(54) HYDRAULIC FLUSHING VALVE ARRANGEMENT

(71) Applicant: Robert Bosch GmbH, Stuttgart (DE)

(72) Inventors: Thomas Froehlich, Beimerstetten (DE); Markus Gepraegs, Ulm (DE); Patrick Weidele, Ulm (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/422,623

(22) Filed: May 24, 2019

(65) Prior Publication Data

US 2019/0360583 A1 Nov. 28, 2019

(30) Foreign Application Priority Data

May 28, 2018 (DE) .................. 10 2018 208 352

(51) Int. Cl.
*F16H 61/4104* (2010.01)
*F16H 61/44* (2006.01)
*F16K 11/044* (2006.01)

(52) U.S. Cl.
CPC ......... *F16H 61/4104* (2013.01); *F16H 61/44* (2013.01); *F16K 11/044* (2013.01);
(Continued)

(58) Field of Classification Search
CPC .. F15B 2211/27; F16H 61/4104; F16H 61/44; F16H 61/4139; F16H 61/4165; F16K 11/044
See application file for complete search history.

(56) References Cited

FOREIGN PATENT DOCUMENTS

DE 103 15 512 B4 11/2004
DE 10 2005 051 324 A1 2/2007
(Continued)

*Primary Examiner* — Abiy Teka
(74) *Attorney, Agent, or Firm* — Maginot, Moore & Beck LLP

(57) ABSTRACT

A hydraulic flushing valve arrangement includes a flushing valve having a housing, flushing piston, and at least one spring. The housing includes a valve bore, two circular housing control edges, two inlet channels fluidically connected to the bore, and an outlet channel opening into the bore between the inlet channels. The piston includes two control collars, a piston neck, and piston control edges that delimit the collars from the neck, and that have circular shapes with a recess. The recess has a portion that, in a cross-sectional plane perpendicular to an axis of the piston, is constant and sized such that a flushing quantity is reduced when the portion of the recess is situated in a region of a corresponding housing control edge relative to a quantity when the piston is in an end position. The collars guide the piston so as to be longitudinally displaceable in the bore, and are spaced apart by the neck. The piston and control edges are configured to control the fluidic connections between the bore, the inlet channels, and the outlet channel. The spring preloads the piston in a middle position whereat the outlet channel is blocked from the inlet channels. The piston is configured to move out of the middle position in response to a specific difference between pressures of the two inlet channels. The control collars are respectively configured to open the fluidic connection between a corresponding inlet channel in which a lower pressure prevails and the outlet channel. Such a flushing valve arrangement is usable in hydrostatic travel drives in which two hydromachines are operated in a closed hydraulic circuit.

20 Claims, 5 Drawing Sheets

(52) U.S. Cl.
CPC ............... *F15B 2211/20569* (2013.01); *F15B 2211/20584* (2013.01); *F15B 2211/27* (2013.01); *F15B 2211/5159* (2013.01); *F15B 2211/611* (2013.01)

(56) References Cited

FOREIGN PATENT DOCUMENTS

| | | | |
|---|---|---|---|
| DE | 10 2011 119 427 A1 | 5/2013 | |
| DE | 11 2014 000 101 T5 | 2/2016 | |
| DE | 112014000101 T5 * | 2/2016 | .......... F15B 13/0401 |
| DE | 10 2015 213 936 A1 | 1/2017 | |
| EP | 2 613 058 A2 | 7/2013 | |

\* cited by examiner

HYDRAULIC FLUSHING VALVE ARRANGEMENT

This application claims priority under 35 U.S.C. § 119 to patent application no. DE 10 2018 208 352.5, filed on May 28, 2018 in Germany, the disclosure of which is incorporated herein by reference in its entirety.

The disclosure concerns a hydraulic flushing valve arrangement with a flushing piston which is guided by two control collars, spaced apart from each other by a piston neck, so as to be longitudinally displaceable in a valve bore of a housing; wherein by means of said piston together with two circular housing control edges, the fluidic connections between two inlet channels opening into the valve bore and an outlet channel opening into the valve bore between the two inlet channels can be controlled; wherein said piston is preloaded by at least one spring in a middle position in which the outlet channel is blocked against the inlet channels; and wherein said piston can be moved out of the middle position above a specific difference between the pressure prevailing in the one inlet channel and the pressure prevailing in the other inlet channel, and hence via a control collar opens a fluidic connection between the inlet channel in which the lower pressure prevails and the outlet channel.

BACKGROUND

Such a flushing valve arrangement is used for example in hydrostatic travel drives in which two hydromachines are operated in a closed hydraulic circuit. Via the flushing valve arrangement, pressurized medium is taken from the respective low-pressure branch of the closed hydraulic circuit in order to discharge heat and dirt particles from the circuit. The flushed pressure medium quantity is replaced by pressure medium fed in through the low-pressure branch, wherein a fixed low pressure of for example 30 bar must be maintained by infeed into the low-pressure branch. Normally, the flushing piston moves above a pressure difference of around 5 bar between the high-pressure branch and the low-pressure branch of the closed hydraulic circuit.

For example, DE 10 2005 051 324 A1 describes a hydraulic flushing valve arrangement having a flushing valve with a flushing piston, the two control collars of which towards the piston neck are provided with three flattenings which are evidently distributed evenly over the periphery of a control collar and open towards the piston neck. The flattenings extend to the diameter of the piston neck and terminate axially in a face standing perpendicularly on the axis of the flushing piston. In the circumferential direction between the flattenings, axial webs are present which are very narrow at the diameter of a control collar. As a result, the design of the control collars of the flushing piston known from DE 10 2005 051 324 A1 ensures that, after opening a fluidic connection between an inlet channel and the outlet channel, the flushing piston is still guided at the corresponding control collar, namely by the webs present between the flattenings. The control edge of a control collar is consequently axially level with the closed ends of the flattenings.

DE 10 2011 119 427 A1 discloses a flushing valve arrangement in which the flushing piston of the flushing valve moves against the force of a spring on small pressure differences of up to for example 40 bar between the two inlet channels, to reach and remain in a position in which the circular control edge of a control collar only has a small distance from the corresponding housing control edge. On greater pressure differences, the flushing piston is moved against the additional force of a second spring, which is higher than the force of the first spring, into a position in which a large axial distance exists between the two said control edges.

DE 103 15 512 B4 discloses a flushing valve arrangement in which the flushing piston is clamped in floating fashion between two springs which have a limited extension travel in one direction. Thus—disregarding friction—the flushing piston moves even on very small pressure differences between the two branches of the closed hydraulic circuit, wherein the gradient of the travel/force curve of the flushing piston to an end of the extension travel of a spring is twice the spring constant of the spring. The control collars of the flushing piston have a portion with a diameter corresponding to the valve bore and ending at a first circular control edge, and towards the inside a second portion with a slightly reduced diameter and with a second circular control edge.

SUMMARY

The disclosure is based on the object of refining a hydraulic flushing valve arrangement of the known type such that oscillations in the hydraulic system in which the flushing valve arrangement is fitted are reduced, and hence comfort and controllability are improved for the driver of a vehicle with a hydrostatic travel drive. The hydraulic flushing valve arrangement should also be constructed compactly.

The desired objective is achieved in a hydraulic flushing valve arrangement of the known type in which the circular form of a piston control edge delimiting a control collar from the piston neck of the flushing piston is interrupted by a least one recess, and the recess has a second portion in which the cross-section, in planes standing perpendicularly to the axis of the flushing piston, is constant and of such a size that the flushing quantity is reduced, in comparison with an end position of the flushing piston, when the second portion of the recess is situated in the region of the housing control edge. To avoid installation errors and because the function method is the same irrespective of whether fluid is flushed out from the first inlet channel or the second inlet channel, both control collars of the flushing piston are provided with one or more recesses in the same fashion.

Using a hydraulic flushing valve arrangement according to the disclosure, the oscillation tendency of a hydraulic system can be reduced or eliminated since the flushing quantity is no longer switched from zero to maximum within a short travel distance of the flushing piston, but rather this takes at least two stages. If the difference between the high pressure prevailing in one inlet channel and the low pressure present in the other inlet channel is already so great that the second portion of the recess at the piston control edge lies in the region of the normally circular housing control edge, a slight change in difference and hence an associated change in position of the flushing piston has no effect or only a slight effect on the flushing quantity, so that oscillations are avoided. The multiple step changes in flushing quantity are achieved by the contour and stroke of the flushing piston. No more than two springs are required, giving a compact construction.

A hydraulic flushing valve arrangement according to the disclosure may advantageously be further refined.

Thus it is favorable if the recess has a first portion with a cross-section, in planes standing perpendicularly to the axis of the flushing piston, which steadily increases with decreasing distance from the piston control edge, starting from the closed end of the recess and at least over a part of the axial extent of the recess, and steadily transforms into the second portion. Thus the transition of diameter of the flushing piston to the second portion of the recess is not abrupt but smooth, so that no—albeit minor—abrupt changes in flushing quantity occur.

In particular, the change in cross-section at the transition between the first portion and the second portion of the recess is equal to zero.

Advantageously, the second portion of the recess is steadily adjoined by a third portion, in which the cross-section of the recess, in planes standing perpendicularly on the axis of the flushing piston, steadily increases and which extends to the piston control edge. Thus the transition to the full flushing quantity is also smooth.

If the second portion of the recess is situated in the region of the housing control edge and the closed end of the recess is beyond the housing control edge, an opening is present at the diameter of the flushing piston which is delimited by the housing control edge and by the delimitation line of the recess on the diameter of the flushing piston. Advantageously, the recess is now formed such that then the cross-section of the second portion of the recess constitutes the minimal throughflow cross-section between an inlet channel and the outlet channel, i.e. the cross-section is smaller than the opening at the diameter of the flushing piston. Then if the second portion of the recess remains in the region of the housing control edge, the flushing quantity will in any case change very little on a change in position of the flushing piston.

Advantageously, the depth of the recess, measured perpendicularly to the axis of the flushing piston, at the piston control edge is smaller than the difference between the diameter of a control collar and the diameter of the piston neck of the flushing piston, so that a large travel of the flushing piston is available for fine adjustment of the flushing quantity.

Advantageously, the recess is formed as a flattening which is easy to produce in comparison with a groove. The flattening has a second portion in which the depth of the flattening is constant and of such a size that the flushing quantity is reduced, in comparison with an end position of the flushing piston, when the second portion of the flattening is situated in the region of the corresponding housing control edge.

The flattening may also have a first portion in which the depth of the flattening, measured perpendicularly to the axis of the flushing piston, steadily increases with decreasing distance from the piston control edge, starting from the diameter of the control collar and at least over a part of the axial extent of the flattening as far as the second portion, and steadily transforms into the second portion. Preferably, the first portion and the second portion of the flattening transform into each other without edges. Also preferably, the first portion transforms without edges into the diameter of the flushing piston. As a result, the flattening in the first portion, starting from the diameter of the flushing piston, runs initially convexly and then concavely towards the second portion. Instead of the term "without edges", the term "without kinks" may also be used.

Advantageously, the flattening has a third portion which ends at the piston control edge and in which the depth of the flattening, measured perpendicularly to the axis of the flushing piston, steadily increases with decreasing distance from the piston control edge. The depth of the third portion may first increase following a curved convex line and then, adjoining this, following a straight line up to the piston control edge. Also, the third portion may transform, following a curved convex line without edges, into the ring face delimiting the control collar from the piston neck of the flushing piston.

Preferably, the first portion and/or the third portion are formed progressively in the axial direction without edges, i.e. not only are there no edges between the portions, but also none within the portions. These configurations may contribute to ensuring a smooth change in the flushing quantity.

A hydraulic flushing valve arrangement according to the disclosure advantageously comprises a pressure-holding valve which is arranged in the outlet channel and reaches an open position when a specific minimal pressure exists in the outlet channel between it and the flushing valve. If the pressure in the low-pressure branch of a closed hydraulic circuit is lower than a minimal pressure of for example 15 bar, the pressure-holding valve is closed so that no pressurized fluid is flushed out, and the pressure in the low-pressure branch does not thereby fall further.

Advantageously, a flushing diaphragm is arranged in the outlet channel between the flushing valve and the pressure-holding valve. The pressure for actuating the pressure-holding valve is taken from upstream of the flushing diaphragm. The flushing diaphragm determines a maximal flushing quantity. If the flushing valve and pressure-holding valve are fully open and a sufficient quantity of pressurized medium is introduced, the low pressure is present at the inlet to the flushing diaphragm and tank pressure at the outlet from the flushing diaphragm. The maximal flushing quantity results from this maximal pressure difference over the flushing diaphragm and the throughflow cross-section of the flushing diaphragm.

The pressure-holding valve and flushing diaphragm, in conjunction with a limited throughflow cross-section in the flushing valve, have a very particular effect. As long as the actual throughflow cross-section in the flushing valve is smaller than the throughflow cross-section of the flushing diaphragm, if the pressure-holding valve—which by its very function is a pressure-actuated directional control valve—were fully open, a pressure would be set between the flushing valve and the flushing diaphragm which is lower than 15 bar for an assumed low pressure of 30 bar and an assumed opening pressure of the pressure-holding valve of 15 bar, but then the pressure-holding valve would close. This means that the pressure-holding valve sets a pressure of 15 bar between the flushing valve and flushing diaphragm, by additional choking of the flushing flow, so that the pressure difference over the flushing valve amounts to a constantly low 15 bar and the flushing quantity is determined solely by the throughflow cross-section of the flushing valve. A throughflow cross-section of the flushing valve, which remains constant over a specific stroke travel of the flushing piston, then also leads to a constant flushing quantity over this stroke travel. Because of the low pressure drop over the flushing valve, the changes in flushing quantity due to the stroke of the flushing piston are also small. This contributes to reducing oscillations in the hydraulic system.

If this throughflow cross-section of the flushing valve is greater than the throughflow cross-section of the flushing diaphragm, the pressure between the flushing valve and the flushing diaphragm rises and the pressure-holding valve is fully opened. The flushing quantity now results from the interaction between the throughflow cross-sections of the flushing valve and of the flushing diaphragm. If finally the throughflow cross-section of the flushing valve is very much greater than the throughflow cross-section of the flushing diaphragm, the full pressure difference of 30 bar is present over the flushing diaphragm, and the flushing quantity is determined by this pressure fall and the throughflow cross-section of the flushing diaphragm. Therefore in view of this circumstance, for fine control of the flushing quantity, not only is a throughflow cross-section reduced but the pressure difference over this throughflow cross-section is also reduced, so that control is particularly precise.

The object on which the disclosure is based, with regard to a smooth change in flushing quantity with the stroke of the flushing piston, is thus achieved in a particularly advantageous fashion by a hydraulic flushing valve arrangement which comprises a flushing valve, a pressure-holding valve and a flushing diaphragm, wherein the flushing valve has a flushing piston which is guided by two control collars, spaced apart from each other by a piston neck, so as to be longitudinally displaceable in a valve bore of a housing; wherein by means of said piston together with two circular housing control edges, the fluidic connections between two inlet channels opening into the valve bore and an outlet channel opening into the valve bore between the two inlet channels can be controlled; wherein said piston is preloaded by at least one spring in a middle position in which the outlet channel is blocked against the inlet channels; and wherein said piston can be moved out of the middle position above a specific difference between the pressure prevailing in the one inlet channel and the pressure prevailing in the other inlet channel, and hence via a control collar opens a fluidic connection between the inlet channel in which the lower pressure prevails and the outlet channel; wherein the pressure-holding valve is arranged in the outlet channel and reaches an open position when a specific minimal pressure exists in the outlet channel between it and the flushing valve; wherein the flushing diaphragm is arranged in the outlet channel between the flushing valve and the pressure-holding valve; and wherein the pressure for actuating the pressure-holding valve is taken from upstream of the flushing diaphragm. A small flushing quantity and smooth change in flushing quantity with the stroke of the flushing piston are then possible if the circular form of a piston control edge, delimiting a control collar from the piston neck of the flushing piston, is interrupted by a least one recess, and the recess opens a throughflow cross-section at the piston control edge, over a certain travel distance of the flushing piston, which is smaller than the opening cross-section of the flushing diaphragm. The particular travel distance of the flushing piston may lie in the region of a few millimeters, for example in the region of 4 mm.

The disclosure is also applied in a hydrostatic drive, in particular a hydrostatic travel drive, comprising two hydromachines which are fluidically connected together in a closed hydraulic circuit via a first working line and a second working line, a feed pump for feeding pressurized medium into the respective working line at low pressure, and a flushing valve arrangement with an inlet channel which is fluidically connected to the first working line and with an inlet channel which is fluidically connected to the second working line, wherein the flushing valve arrangement is configured according to the disclosure.

BRIEF DESCRIPTION OF THE DRAWINGS

A hydrostatic travel drive according to the disclosure and two exemplary embodiments of a hydraulic flushing valve arrangement according to the disclosure are depicted in the drawings. The disclosure is now explained in more detail with reference to the figures of these drawings.

The drawings show.

DETAILED DESCRIPTION

Figure 1:
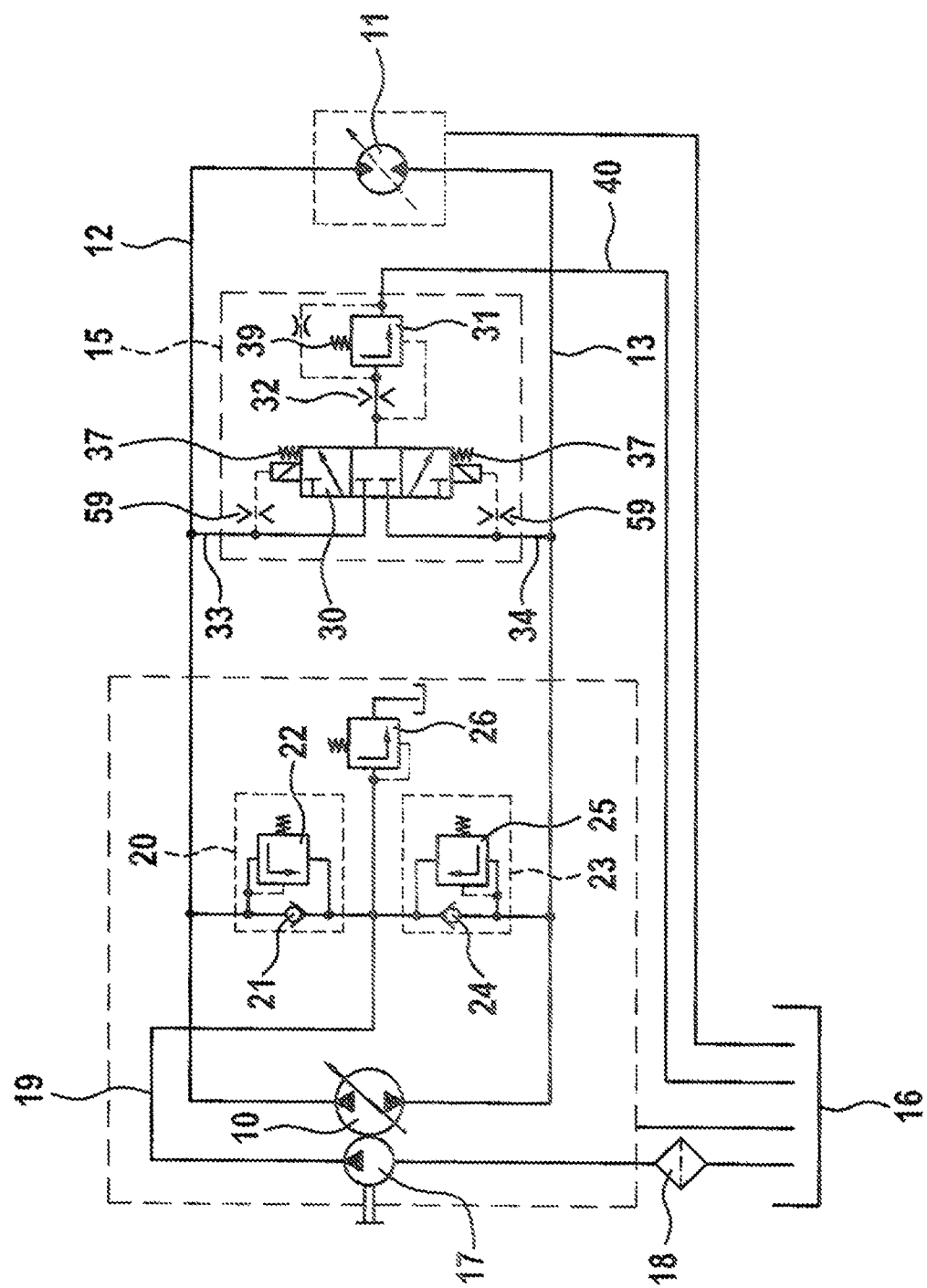
FIG. 1 the circuit diagram of a hydrostatic travel drive according to the disclosure, FIG. 2 a longitudinal section, up to the flushing piston shown in front view, through the first exemplary embodiment of a hydraulic flushing valve arrangement with a flushing valve, a pressure-holding valve and a flushing diaphragm to establish the maximal flushing quantity, FIG. 3 an enlarged extract from FIG. 2 in the region of a control edge of the flushing piston, FIG. 4 an enlarged extract from FIG. 3 in a sectional plane rotated through 90°, and FIG. 5 a longitudinal section through the second exemplary embodiment in the region of the pressure-holding valve.

The hydrostatic travel drive from FIG. 1 comprises a first hydromachine 10 with adjustable stroke volume, which works primarily as a hydropump and can be driven by a drive motor (not shown in detail), for example a diesel engine, and a second hydromachine 11, also with adjustable stroke volume, which works primarily as a hydromotor and can drive at least one wheel of the vehicle. In overrun mode of the vehicle, the hydromotor 11 may work as a hydropump and the hydropump 10 as a hydromotor. The hydropump 10 and hydromotor 11 are fluidically connected together in a closed hydraulic circuit via a first working line 12 and a second working line 13. In operation, one of the two working lines forms the low-pressure side and the other working line forms the high-pressure side of the closed hydraulic circuit.

The task of a hydraulic flushing valve arrangement 15 is to flush heated pressurized fluid, carrying dirt particles, out from the closed hydraulic circuit into a tank 16.

The flushed quantity of pressurized fluid and the quantity of pressurized fluid lost through leakage from the closed hydraulic circuit are replaced by infeed into the low-pressure side. For this, a feed pump 17 is provided which is normally combined with the hydropump 10 and is driven with this by the drive motor. The feed pump 17 draws pressurized fluid from the tank 16 via a filter 18 and delivers the pressurized fluid to a feed line 19. A first pressure infeed valve 20 is arranged between this feed line and the first working line 12, and constitutes a combination of an infeed valve 21—formed as a check valve opening from the feed line 19 to the first working line 12—and a pressure-limiting valve 22, the inlet of which is connected to the first working line 12 and the outlet of which is connected to the feed line 19. The pressure-limiting valve 22 limits the pressure in the first working line to a maximal high pressure of for example 300 bar. A second pressure infeed valve 23 is arranged between the feed line 19 and the second working line 13, and constitutes the combination of an infeed valve 24—formed as a check valve opening from the feed line 19 to the first working line 12—and a pressure-limiting valve 25, the inlet of which is connected to the second working line 13 and the outlet of which is connected to the feed line 19. The pressure-limiting valve 25 limits the pressure in the second working line to a maximal high pressure of for example also 300 bar. Furthermore, a feed pressure-limiting valve 26 is connected to the feed line 19, which limits the pressure in the feed line 19, and hence on the respective low-pressure side of the closed hydraulic circuit, to the maximal low-pressure of for example 30 bar.

Figure 2:
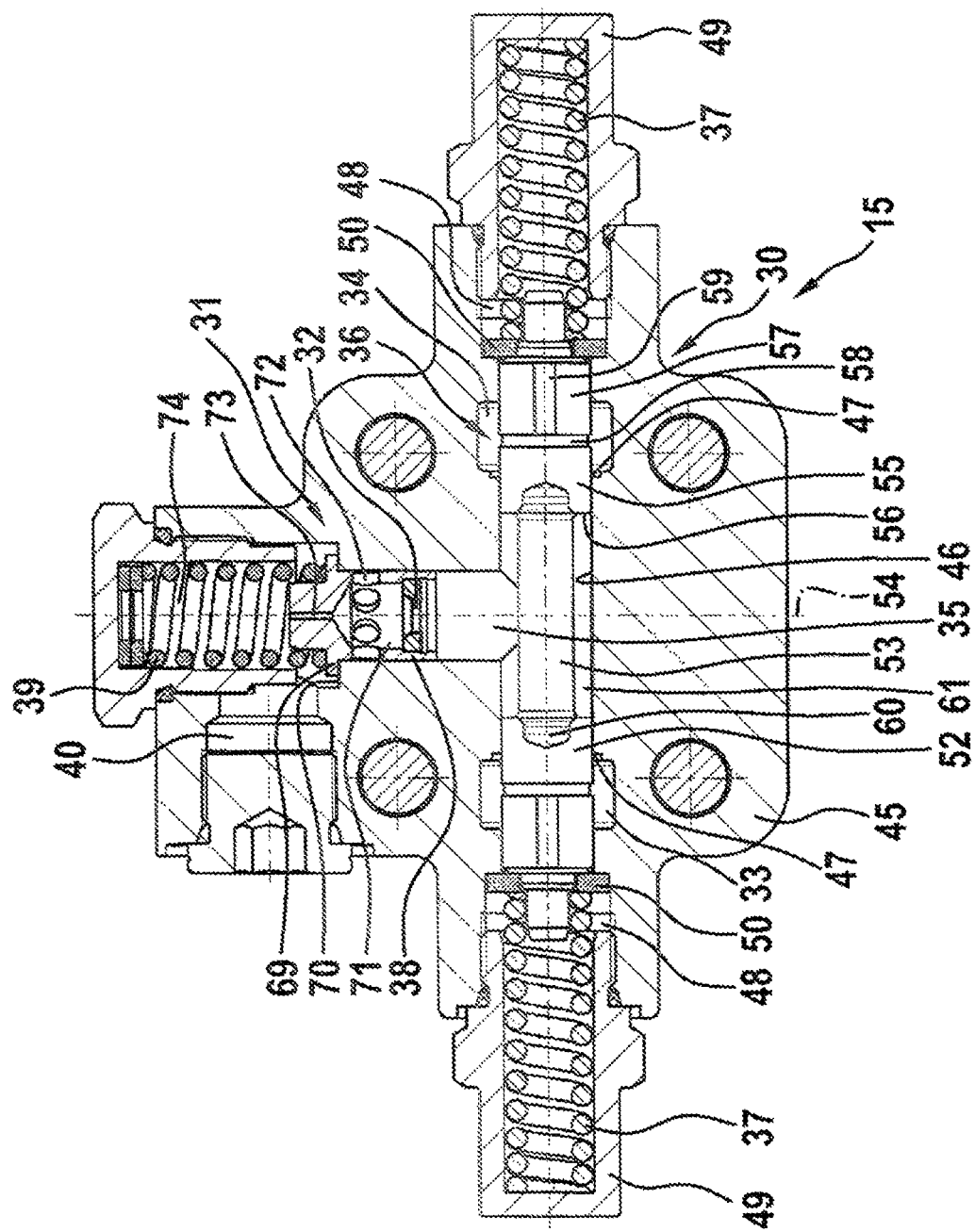
Figure 3:
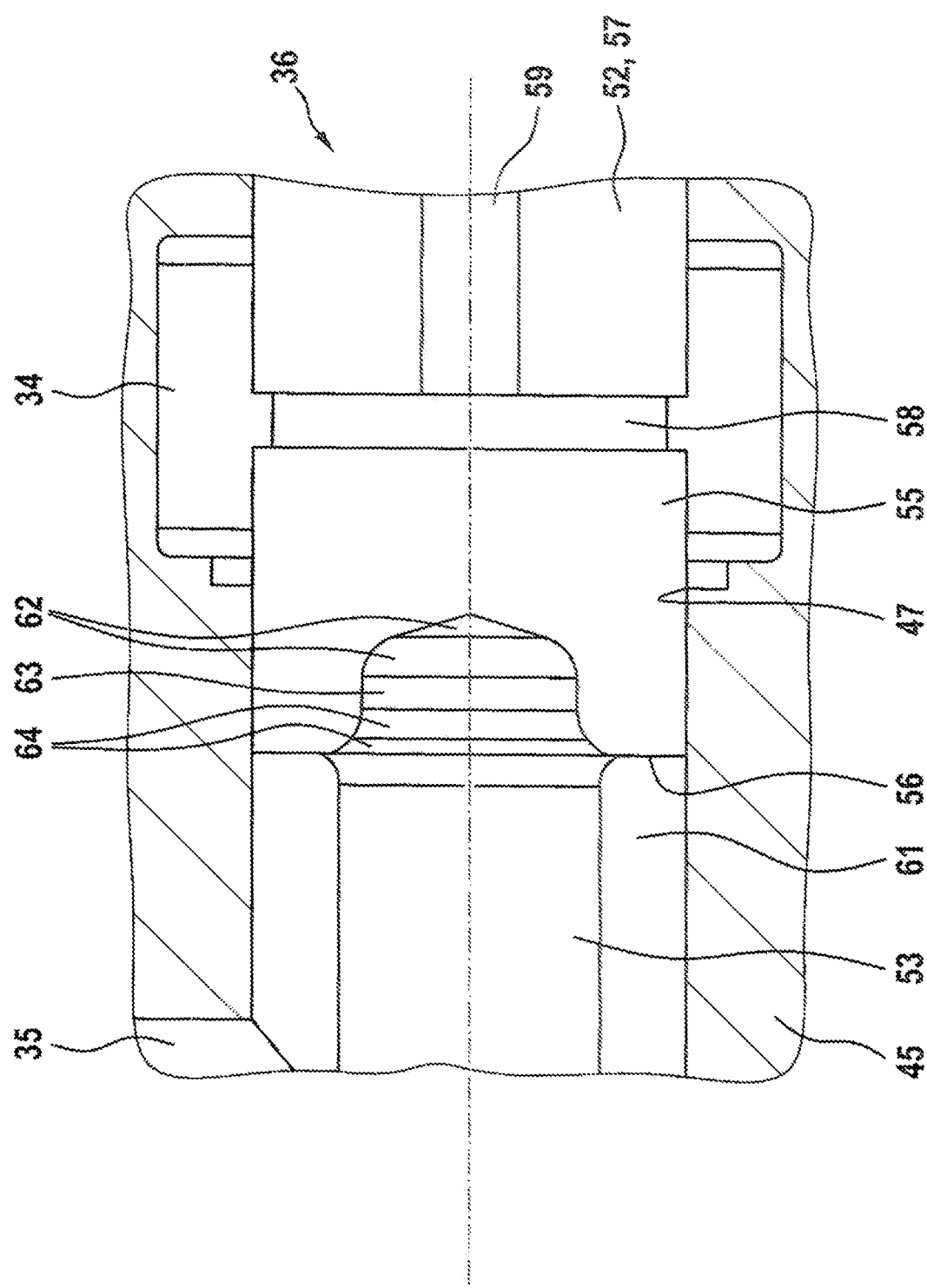
Figure 4:
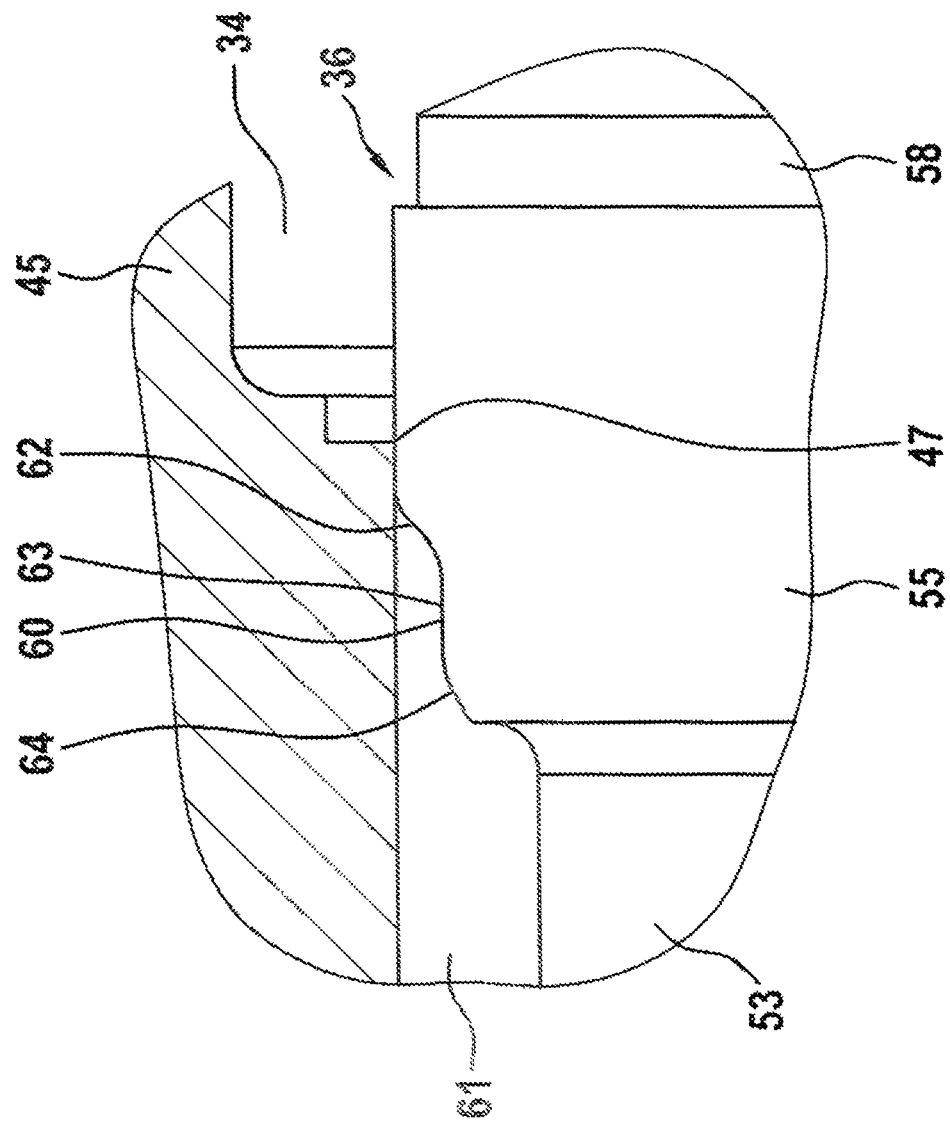

The flushing valve arrangement 15 comprises a flushing valve 30, a pressure-holding valve 31 and a flushing diaphragm 32. The flushing valve 30 has a first inlet channel 33 which is connected to the first working line 12, and a second inlet channel 34 which is connected to the second working line 13, and an outlet channel 35. A flushing piston 36 of the flushing valve 30, the design of which is more evident from FIGS. 2 to 4, is centered in a middle position by two preloaded compression springs 37, and above a specific pressure difference between the pressure prevailing in the one inlet channel and the pressure prevailing in the other inlet channel, said piston can be moved out of the middle position into a position in which the working line carrying the low pressure is open towards the outlet channel 35. The pressure difference above which the flushing piston moves from its middle position lies for example at 5 bar. Firstly the flushing diaphragm 32 and then, downstream of the flushing diaphragm, the pressure-holding valve 31 are arranged in the outlet channel 35. The pressure-holding valve 31 has a valve piston 38 which attempts to assume a closed position under the effect of a compression spring 39, and which is loaded in the opening direction by a pressure which is taken from upstream of the flushing diaphragm 32, between this and the flushing valve. The pressure-holding valve 31 begins to open when the pressure taken is for example 15 bar. The flushing oil flowing through the flushing valve arrangement flows back to the tank 16 via a return line 40.

As evident from FIGS. 2 to 4, the flushing valve arrangement 15 comprises a housing 45 common to the flushing valve 30, the pressure-holding valve 31 and the flushing diaphragm 32; wherein a valve bore 46, in which the flushing piston 36 is guided so as to be linearly movable, passes through said housing. The first inlet channel 33 and, axially spaced therefrom, the second inlet channel 34—the opening regions of which are formed as peripheral control chambers each with a circular housing control edge 47—open into the valve bore 46. Centrally between the two inlet channels, the outlet channel 35 opens as a plain bore perpendicularly into the valve bore 46.

At each end, the valve bore 46 transforms at a step into a spring chamber 48 which has a greater diameter than the other portions of the valve bore 46 and than the flushing piston 36. The axial spacing between the two steps is the same size as the axial spacing between two stop faces on the flushing piston 36. A closing screw 49 with a blind hole, which largely receives the respective spring 37, is screwed into each spring chamber 48. The spring 37 protrudes from the blind hole and loads a disc 50 which can bear simultaneously on the one stop face of the flushing piston 36 and on the one step of the valve bore 46. Thus if no further forces act on the flushing piston 36, then under the effect of the spring 37 it assumes the middle position shown in FIG. 2, from which it only moves if the external force overcomes the preload force of a spring 37.

The flushing piston 36 has two control collars 52 axially spaced apart from each other, in which the diameter of the flushing piston 36 is equal—taking into account a slight clearance—to the diameter of the valve bore 46 and which are connected together by a piston neck 53, the diameter of which is substantially smaller than the diameter of the valve bore 46 and which, in each position of the flushing piston 36, are always situated in the region of the outlet channel 35. The flushing piston is configured to be completely symmetrical relative to a plane 54 passing centrally through the flushing piston 36 and standing perpendicularly on the axis of the flushing piston. Therefore only the one control collar and its interaction with one inlet channel and the outlet channel are explained in more detail below.

At each control collar 52, we can distinguish a portion 55 located towards the piston neck 53 and delimited from the piston neck by a piston control edge 56, and a portion 57 located towards the spring chamber 48 and guiding the flushing piston in the valve bore 46 between an inlet channel and a spring chamber. The two portions 55 and 57 are clearly delimited from each other by a circumferential groove 58, which is situated in the region of the opening of the inlet channel in every position of the flushing piston. Two diametrically opposed flattenings 59, which have a constant cross-section over their length in the axial direction and which connect the inlet channel in choked fashion to the spring chamber, run on the outside of the portion 56, starting from the groove 58. The two flattenings 59 form the damping choke, evident in FIG. 1, in a control line leading from an inlet channel to a spring chamber, via which the pressure in a working line for actuating the flushing piston 36 is taken.

The control edge 56 at the portion 55 of a piston control collar 52 is interrupted by two diametrically opposed recesses, which are configured as flattenings 60 and are open to the clear space 61 around the piston neck 53. The piston control edge 56 runs between the two flattenings 60 in the form of two circle arcs. The four flattenings 60 in total are configured identically. The flattenings 60 are flat in cross-sections in planes standing perpendicularly on the longitudinal axis of the flushing piston 36, as already indicated by the term "flattening", but their depth varies progressively in the axial direction of the flushing piston 36. In an axial plane of the flushing piston 36 passing centrally through a flattening 60, a flattening 60 has a first portion 62 in which the depth of the flattening, measured perpendicularly to the axis of the flushing piston, steadily increases with decreasing distance from the piston control edge, starting from the diameter of a control collar 52 and over part of the axial extent of the flattening up to a second portion 63, and transforms constantly into the second portion. The first portion 62—or more precisely, the contour of the control piston 36 in the region of a flattening 60—runs, starting from the diameter of a piston control collar 56, initially convexly curved and then concavely, and transforms without edges into the diameter of a control collar 52 and into the second portion 63.

In the second portion 63, the depth of a flattening 60 is constant and amounts to around one-fifteenth of the diameter of a control collar 52 of the control piston 36.

Each flattening 60 has a third portion 64 which adjoins the second portion 63 directly without an edge and ends at the piston control edge 56. In the third portion 64, the depth of a flattening steadily increases with decreasing distance from the piston control edge. The third portion 64 is initially convexly curved and then straight up to just before the piston control edge 56, and then transforms convexly in a very small radius into the ring face which delimits a control collar 52 from the piston neck 53.

The contour of a recess 60, in an axial plane of the flushing piston 36 passing centrally through said recess, is particularly clearly evident in FIG. 4. In particular, it is clear that the contour has no edges inside the portions 62 and 64, i.e. can be differentiated at all points.

If the flushing piston can perform a total stroke of 6.5 mm from its middle position, the following has proved suitable: with a positive overlap of 1 mm, a throughflow cross-section between the two flattenings 60 of a control collar 52 of the flushing piston 36 begins to open after a stroke of 1 mm. The depth of the flattenings 60 then increases over a further stroke of around 2.2 mm (may lie in the range from 2.1 to 2.4 mm), but then remains constant over a stroke of around 1.2 mm (may lie in the range from 1.1 to 1.3 mm), in order then to increase again over a further stroke of 1.6 mm (may lie in the range from 1.5 to 1.8 mm). The piston control edge 56 then travels over the housing control edge 47 and the flushing valve is fully opened on the further 0.5 mm stroke of the flushing piston 36.

The valve piston 38 of the pressure-holding valve 31 is inserted in the outlet channel 35 (formed as a bore) and guided so as to be axially movable therein. On the outside, it has a peripheral shoulder 69 which can be pressed by a compression spring 39 against a step 70 of the housing 45, and is configured as a hollow piston with a blind hole 71 which is open to the valve bore 46. The flushing diaphragm 32 is inserted in the blind hole 71. Between this diaphragm and the base of the blind hole 71, six radial bores 72 run outward from the latter into a very flat ring groove running around the valve piston 38 at a distance from the shoulder 70. Thus the valve piston 38 is loaded in the opening direction by the pressure present in the outlet channel 35 between the flushing diaphragm 32 and the flushing valve 30, against the force of the compression spring 39.

Normally, the compression spring is preloaded to an equivalent pressure in the region of 50 bar. The pressure-holding valve 31 thus only opens when the pressure upstream of the flushing diaphragm 32—and hence in the low-pressure branch of the closed hydraulic circuit—reaches 15 bar, and closes when the pressure falls below 15 bar. This ensures that only very little flushing oil is taken from the low-pressure branch below a pressure of 15 bar. The low quantity of flushing oil is extracted by a nozzle 73 which, as a fine bore in the valve piston 38, leads from the blind hole 71 to the spring chamber 74 containing the compression spring 39. If the pressure rises above 15 bar, this leads to the opening characteristic of the valve piston 38, whereby this initially sets the pressure upstream of the flushing diaphragm 32 to 15 bar before reaching a throughflow cross-section which is very large in comparison with the throughflow cross-section of the flushing diaphragm 32.

When a hydraulic flushing valve arrangement according to the disclosure is used in a closed hydraulic circuit, the flushing piston 36 is moved out of the middle position—shown in FIGS. 2 to 4—when the pressure difference between the two working lines is greater than 5 bar. As the pressure difference increases, with the first portion 62 of the two flattenings 60 at the corresponding control collar 52, the flushing piston 36 opens a throughflow cross-section which becomes ever greater before—because of the second portion 63 of the flattenings 60—the throughflow cross-section remains constant over a specific stroke of the flushing piston 36. In the third portion 64 of the flattenings 60, the flushing piston 36 opens slowly up to the fully opened cross-section. The throughflow cross-section at the flushing piston 36 is initially smaller than the throughflow cross-section of the flushing diaphragm 32. Depending on design, this may also be the case when the second portion 63 of the flattenings 60 is situated in the region of the housing control edge 47. As long as the throughflow cross-section at the flushing piston 36 is smaller than the throughflow cross-section of the flushing diaphragm 32, the pressure-holding valve 31 sets a pressure of 15 bar between the flushing valve 30 and the flushing diaphragm 32. The flushing oil quantity is then determined by the throughflow cross-section at the flushing piston 36 and the pressure difference between the low pressure and the opening pressure of the pressure-holding valve 31 at the level of 15 bar. If the throughflow cross-section at the flushing valve 30 is greater than the throughflow cross-section of the flushing diaphragm 32, the pressure-holding valve 31 opens fully, and the flushing oil quantity results from the series connection of two throughflow cross-sections. If the second portion 63 of the flattenings 60 is situated in the region of a housing control edge 47, the throughflow cross-section at the flushing valve 30 is constant over a specific stroke of the flushing piston 36. Then the flushing oil quantity also remains constantly at a low value, irrespective of whether now the throughflow cross-section at the flushing valve 30 is larger or smaller than the throughflow cross-section of the flushing diaphragm 32. On a further stroke of the flushing piston 36, finally the piston control edge 56 travels over the housing control edge 47, and the throughflow cross-section in the flushing valve is at a maximum and substantially larger than the throughflow cross-section of the flushing diaphragm 32. Now the flushing oil quantity is determined by the throughflow cross-section of the flushing diaphragm 32 and the amount of the low pressure insofar as this exceeds the opening pressure of the pressure-holding valve 31.

It is clear that the pressure-holding valve here not only has the function of suppressing the extraction of flushing oil when the low pressure is smaller than 15 bar. When the pressure difference between the high pressure and the low pressure is small, but the low pressure exceeds the opening pressure of the pressure-holding valve, this additionally influences the flushing oil quantity because it makes the pressure difference over the flushing valve smaller than the low pressure when the throughflow cross-section of the flushing valve 30 is smaller than the throughflow cross-section of the flushing diaphragm 32.

Figure 5:
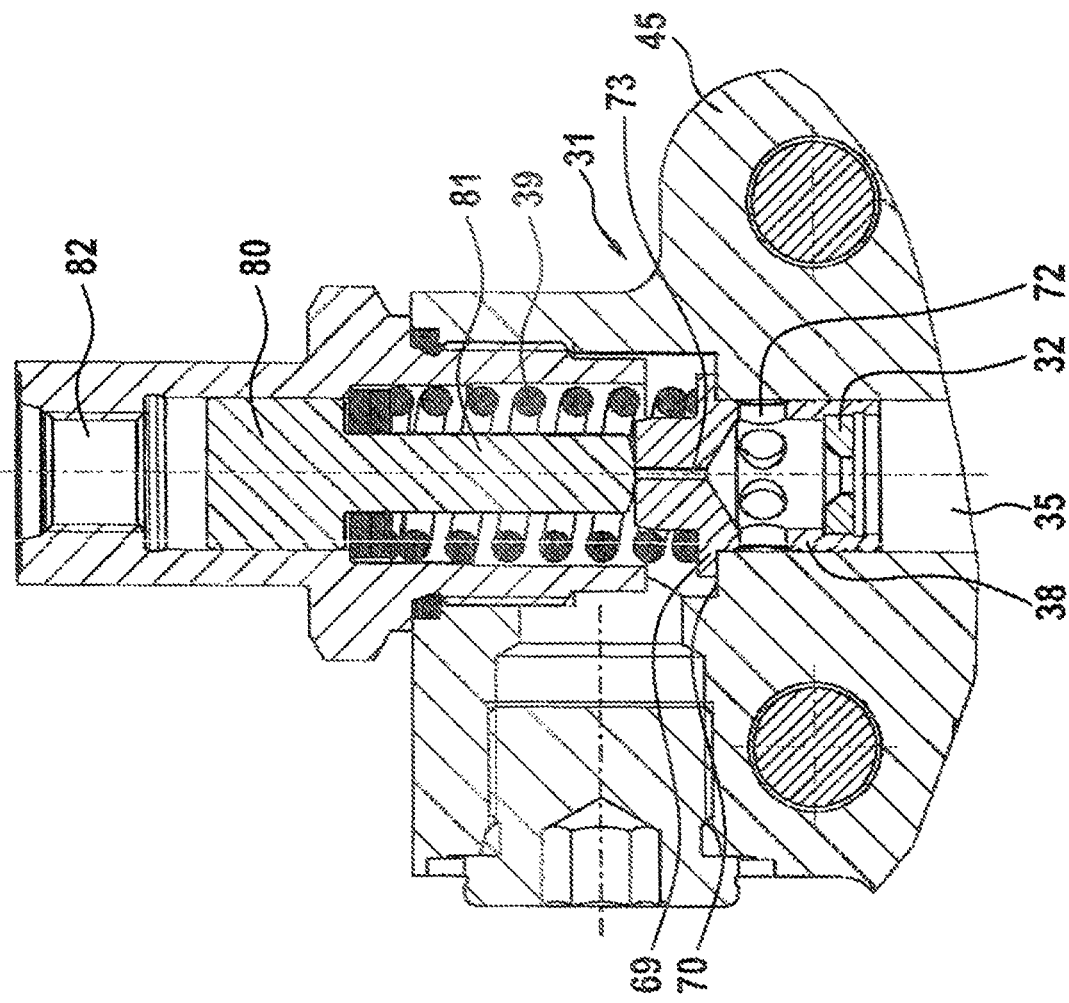

In the exemplary embodiment of FIG. 5, the flushing of a closed hydraulic circuit can be switched off. For this, a closing piston 80 is provided, via which the valve piston 38 of the pressure-holding valve 31 can be loaded with a force in the closing direction. The closing piston 80 is arranged behind the compression spring 39, has the same diameter as the valve piston 38 and comprises an actuating rod 81 with which it can act on the valve piston 38 through the compression spring 39. With the rounded end face of the actuating rod 81, it can also close the bore/nozzle 73 in the valve piston 38. The closing piston can be loaded with a pressure via a control port 82. This pressure may for example be taken via a switching valve (not shown in detail) between the flushing valve and the flushing diaphragm 32. If the switching valve is open, the pressure forces acting on the valve piston 38 are balanced so that the compression spring 39 can hold the valve piston 38 in its closed position. Thus a flushing oil flow can be switched on and off depending on situation. One example of this is a situation in which the hydropump is very quickly moved through neutral, but the flushing valve cannot follow as quickly and therefore a great quantity would be flushed out of the new high-pressure side for a short time, which would lead to a severe pressure loss on the new low-pressure side. This situation can occur above all when the hydropump is operated with a synchronizing cylinder which can be driven in oscillation in a closed hydraulic circuit.

LIST OF REFERENCE SIGNS

10 Hydropump
11 Hydromotor
12 First working line
13 Second working line
15 Flushing valve arrangement
16 Tank 17 Feed pump
18 Filter
19 Feed line
20 First pressure-infeed valve
21 Infeed valve
22 Pressure-limiting valve
23 Second pressure-infeed valve
24 Infeed valve
25 Pressure-limiting valve
26 Feed pressure-limiting valve
30 Flushing valve
31 Pressure-holding valve
32 Flushing diaphragm
33 First inlet channel
34 Second inlet channel
35 Outlet channel
36 Flushing piston
37 Compression springs
38 Valve piston of 31
39 Compression spring
40 Return line
45 Housing of 15
46 Valve bore
47 Housing control edges
48 Spring chambers
49 Closing screw
50 Disc
52 Control collar
53 Piston neck
54 Symmetry plane
55 Portion of 52
56 Piston control edge at 52
57 Portion of 52
58 Peripheral groove
59 Flattenings in 57
60 Flattenings in 55
61 Clear space around 53
62 First portion of 60
63 Second portion of 60
64 Third portion of 60
69 Shoulder at 38
70 Step at 45
71 Blind hole in 38
72 Radial bores in 38
73 Nozzle
74 Spring chamber
80 Closing piston
81 Actuating rod of 80
82 Control port

What is claimed is:

1. A hydraulic flushing valve arrangement, comprising:
a flushing valve configured to flush out a flushing quantity, and including:
a housing, having:
a valve bore;
two circular housing control edges;
two inlet channels flowing into the valve bore; and
an outlet channel opening into the valve bore between the two inlet channels;
a piston, having
a piston neck;
two piston control edges, each piston control edge having a circular shape;
a respective recess in each of the two piston control edges, each of the respective recesses having a second portion with a first plurality of cross-sections, in a first plurality of planes perpendicular to an axis of the piston, that are constant; and
two control collars spaced apart from each other by the piston neck and delimited from the neck by the two piston control edges, respectively;
wherein
the control collars are configured to guide the piston so as to be longitudinally displaceable in the valve bore of the housing such that the piston, together with the two housing control edges, is configured to control fluidic connections between the two inlet channels and the outlet channel;
a spring preloads the piston in a middle position whereat the fluidic connections between the outlet channel and the inlet channels is blocked, the piston configured to move out from the middle position in response to a specific difference between a first pressure prevailing in a first of the two inlet channels and a second pressure prevailing in a second of the two inlet channels and, via the respective recess in a corresponding one of the two control collars, open a fluidic connection between the outlet channel and a corresponding one of the two inlet channels having a lower prevailing pressure; and
the first plurality of cross-sections are sized such that the flushing quantity is reduced when the first plurality of cross-sections are positioned in a region of one of the housing control edges relative to the flushing quantity when the flushing piston is in an end position.

2. The hydraulic flushing valve arrangement of claim 1, wherein:
each respective recess further has a first portion with a second plurality of cross-sections, in a second plurality of planes perpendicular to the axis of the piston, that steadily increase with decreasing distance from a corresponding one of the two piston control edges; and
the first portion starts from a closed end of the respective recess, extends over at least a part of an axial extent of the respective recess, and steadily transforms into the second portion.

3. The hydraulic flushing valve arrangement of claim 2, wherein a change in cross-section at a transition between the first portion and the second portion of each recess is equal to zero.

4. The hydraulic flushing valve arrangement of claim 2, wherein each respective recess further has a third portion adjoining the second portion, the third portion having a third plurality of cross-sections, in a third plurality of planes perpendicular to the axis of the piston, that steadily increase from the second portion to the corresponding one of the piston control edges.

5. The hydraulic flushing valve arrangement of claim 2, wherein each of the first plurality of cross-sections define a minimal throughflow cross section between a corresponding one of the inlet channels and the outlet channel when the piston is positioned such that the second portion is located in a region of the corresponding one of the housing control edges.

6. The hydraulic flushing valve arrangement of claim 1, wherein a depth of each respective recess at the corresponding one of the piston control edges, measured perpendicularly to the axis of the piston, is smaller than a difference between a diameter of a corresponding one of the control collars and a diameter of the piston neck.

7. The hydraulic flushing valve arrangement of claim 1, wherein:
   each respective recess is formed by at least one flattening of the corresponding one of the piston control edges; and
   a cross section of each respective recess is defined by a depth of the flattening.

8. The hydraulic flushing valve arrangement of claim 7, wherein:
   each respective recess further has a first portion in which a depth of the respective recess, measured perpendicularly to the axis of the piston, steadily increases with decreasing distance from a corresponding one of the two piston control edges; and
   the first portion starts from a diameter of a corresponding one of the control collars, extends over at least a part of an axial extent of the respective recess as far as the second portion, and steadily transforms into the second portion.

9. The hydraulic flushing valve arrangement of claim 8, wherein the second portion and first portion transform into each other without an edge.

10. The hydraulic flushing valve arrangement of claim 8, wherein the first portion transforms into the diameter of the piston without an edge.

11. The hydraulic flushing valve arrangement of claim 8, wherein each respective recess further has a third portion ending at the corresponding one of the piston control edges, and in which the depth of the flattening, measuring perpendicularly to the axis of the piston, steadily increases with decreasing distance from the corresponding one of the piston control edges.

12. The hydraulic flushing valve arrangement of claim 11, wherein a depth of flattening at the third portion initially increases following a curved convex line, and then follows a straight line up to the corresponding one of the piston control edges.

13. The hydraulic flushing valve arrangement of claim 11, wherein the third portion transforms, following a curved convex line and without an edge into a ring face of the piston delimiting the corresponding one of the piston control collars from the piston neck.

14. The hydraulic flushing valve arrangement of claim 11, wherein one or more of the first portion and the third portion is progressive in the axial direction and is without edges.

15. The hydraulic flushing valve arrangement of claim 1, further comprising:
   a pressure-holding valve positioned in the outlet channel, and configured to move into an open position in response to a specific minimal pressure prevailing in the outlet channel between the pressure-holding valve and the flushing valve.

16. The hydraulic flushing valve arrangement of claim 15, further comprising:
   a flushing diaphragm positioned in the outlet channel between the flushing valve and the pressure-holding valve, the pressure-holding valve configured such that the specific minimal pressure for opening the pressure-holding valve prevails upstream of the flushing diaphragm.

17. A hydraulic flushing valve arrangement, comprising:
a flushing valve configured to flush out a flushing quantity, and including:
   a housing, having:
      a valve bore;
      two circular housing control edges;
      two inlet channels flowing into the valve bore; and
      an outlet channel opening into the valve bore between the two inlet channels;
   a piston, having
      a piston neck;
      two piston control edges, each piston control edge having a circular shape;
      a respective recess in each of the two piston control edges; and
      two control collars spaced apart from each other by the piston neck and delimited from the neck by the two piston control edges, respectively;
wherein
   the control collars are configured to guide the piston so as to be longitudinally displaceable in the valve bore of the housing such that the piston, together with the two housing control edges, is configured to control fluidic connections between the two inlet channels and the outlet channel;
   a spring preloads the piston in a middle position whereat the fluidic connections between the outlet channel and the inlet channels is blocked, the piston configured to move out from the middle position in response to a specific difference between a first pressure prevailing in a first of the two inlet channels and a second pressure prevailing in a second of the two inlet channels and, via a corresponding respective recess in one of the two control collars, open a fluidic connection between the outlet channel and a corresponding one of the two inlet channels having a lower prevailing pressure;
   a pressure-holding valve is positioned in the outlet channel, and configured to move into an open position in response to a specific minimal pressure prevailing in the outlet channel between the pressure-holding valve and the flushing valve;
   a flushing diaphragm is positioned in the outlet channel between the flushing valve and the pressure-holding valve, the pressure-holding valve configured such that the specific minimal pressure for opening the pressure-holding valve prevails upstream of the flushing diaphragm; and
   each respective recess is configured to open a respective throughflow cross section at the corresponding one of the housing control edges that is constant along a portion of the axial extent of the piston, and that is smaller than an opening cross section of the flushing diaphragm.

18. A hydrostatic drive, comprising:
two hydromachines fluidically connected together in a closed hydraulic circuit via a first working line and a second working line;
a feed pump configured to feed pressurized medium into the first and second working lines at a low pressure; and
a flushing valve configured to flush out a flushing quantity, and including:
   a housing, having:
      a valve bore;
      two circular housing control edges;
      two inlet channels flowing into the valve bore; and
      an outlet channel opening into the valve bore inwardly of the two inlet channels;
   a piston, having
      a piston neck;
      two piston control edges, each piston control edge having a circular shape;

a respective recess in each of the two piston control edges, each of the respective recesses having a closed end located outwardly of the associated piston control edge; and two control collars spaced apart from each other by the piston neck and delimited from the neck by the two piston control edges, respectively;

wherein the control collars are configured to guide the piston so as to be longitudinally displaceable in the valve bore of the housing such that the piston, together with the two housing control edges, is configured to control fluidic connections between the two inlet channels and the outlet channel;

a spring preloads the piston in a middle position whereat the fluidic connections between the outlet channel and the inlet channels is blocked, the piston configured to move out from the middle position in response to a specific difference between a first pressure prevailing in a first of the two inlet channels and a second pressure prevailing in a second of the two inlet channels and, via a corresponding one of the two control collars, open a fluidic connection between the outlet channel and a corresponding one of the two inlet channels having a lower prevailing pressure through the respective recess; and a first of the two inlet channels is fluidically connected to the first working line, and a second of the two inlet channels is fluidically connected to the second working line.

19. The hydrostatic drive of claim 18, wherein the hydrostatic drive is a hydrostatic travel drive.

20. The hydrostatic drive of claim 18, wherein:

a first of the respective recesses has a first non-zero radial extent in a first cross-section of the piston;

the piston control edge associated with the first of the respective recesses has a second non-zero radial extent in the first cross-section of the piston; and the first radial extent is less than the second radial extent.

\* \* \* \* \*